Jan. 18, 1955     A. SETTER     2,699,605
GARDEN TOOL
Filed April 2, 1951     2 Sheets-Sheet 1
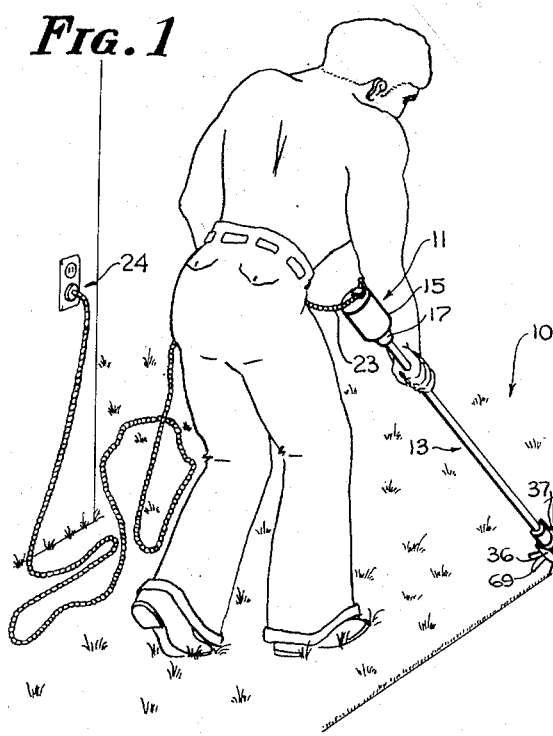
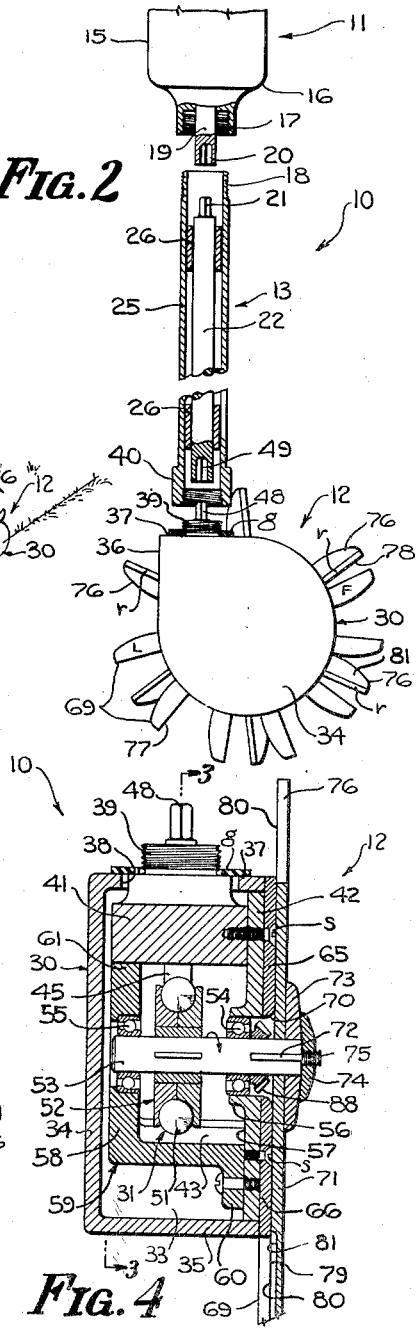
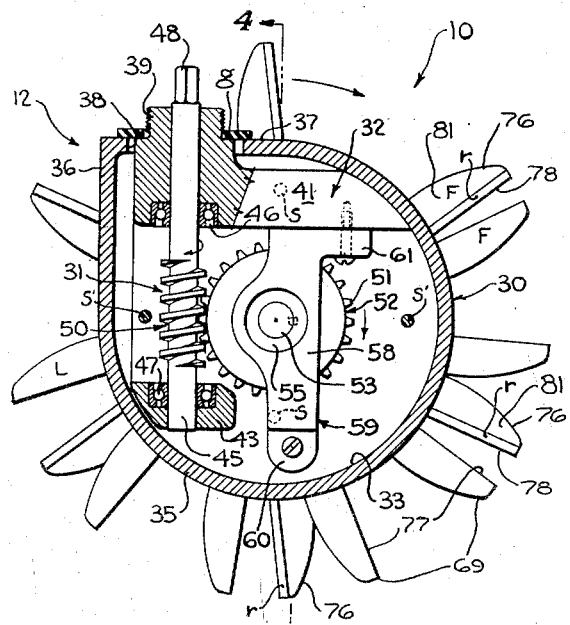
INVENTOR.
Arnt Setter
BY
Leslie M. Hansen
HIS ATTORNEY.

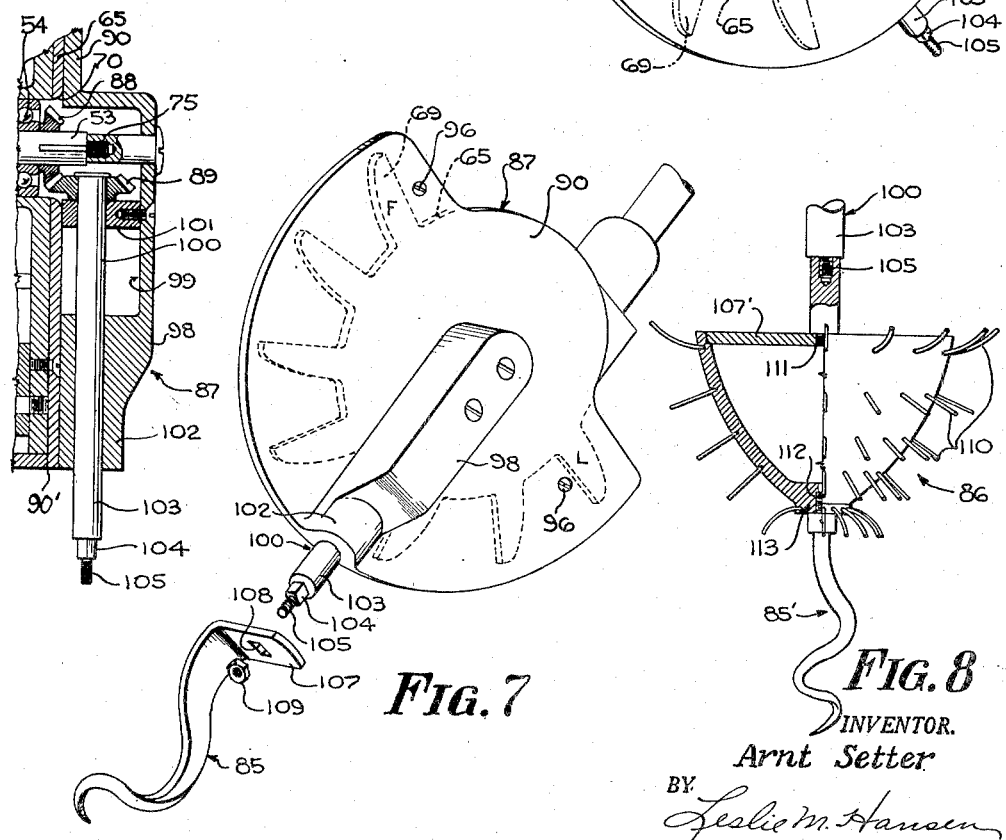

United States Patent Office 2,699,605
Patented Jan. 18, 1955

2,699,605

GARDEN TOOL

Arnt Setter, Santa Clara, Calif.

Application April 2, 1951, Serial No. 218,741

4 Claims. (Cl. 30—206)

This invention relates to garden tools and the like and particularly to a multi-purpose garden tool of the rotary type for providing a lawn edge trimmer, an earth conditioner and/or a cultivating tool.

The present invention contemplates the provision of an automatically powered drive head constructed to facilitate rotary action to a shear blade, an auger, a rake or discing tool and the like. More specifically the present invention has as one of its objects the provision of a hand tool embodying an electrically powered motor carried on one end of a canelike shank or handle having a drive head at its opposite end.

It is another object of this invention to support the source of power well away from the surface of the earth to prevent short circuiting of the power source due to contact thereof with wet foilage and the like.

Another object is to provide a gear reduction drive head for a rotary type garden tool for attaining maximum efficiency of rotary action with a minimum of power from the source thereof.

Still another object is to provide a drive head so constructed as to facilitate adaptation thereof to various forms of rotary type tools and attachments.

It is a further object of the present invention to provide a stationary plate on the drive head with radially extended shear blades cooperable with complementary and opposing shear blades on a rotary plate drivingly connected to the drive head.

Yet another object is to provide complementary stationary and rotary shear blades of differential radial spacing whereby only one opposing set of such blades is effective at any particular time to thereby minimize resistance due to the shearing action of such blades.

These and other objects and advantages of the present invention will become more apparent from a reading of the following description in conjunction with the drawings in which:

Fig. 1 is a perspective view illustrative of the garden tool of the present invention in use as a lawn edge trimmer.

Fig. 2 is a side elevational view, partially in section, of the garden tool shown in Fig. 1.

Fig. 3 is an enlarged section through the drive head of the tool shown in Figs. 1 and 2 taken substantially along line 3—3 in Fig. 4.

Fig. 4 is a section of Fig. 3 taken along line 4—4 thereof.

Fig. 5 is a perspective view of the drive head shown in Figs. 3 and 4 with a rotary blade of the trimmer unit removed.

Fig. 6 is a perspective view of the inner face of an adapter attachable to the drive head shown in Fig. 5.

Fig. 7 is another perspective view of the adapter shown in Fig. 6 as seen from its opposite side when connected to the drive head and showing a cultivating tool associated therewith.

Fig. 8 is a side view, partially in section, of another form of cultivating tool connected to the adapter shown in Figs. 6 and 7.

Fig. 9 is a fragmentary section showing the coupling between the adapter and drive head.

In the drawings the garden tool, generally designated 10, is a hand type tool comprising a source of power 11 and a drive head 12 joined by a shank 13 of cane length but capable of being longer if so desired.

The source of power 11 is preferably an electric motor 15 having its housing 16 provided with a threaded boss 17 adapted to be secured to one threaded end 18 of the shank 13. The motor 15 includes a drive shaft 19 disposed axially of the boss 17 and including a keyed end 20 in the form of a square socket adapted to drivingly fit upon the square end 21 of a drive shaft 22 journalled within the shank 13 for rotation.

The motor 15 is connected by a conductor wire 23 to any suitable electrical outlet such as the one 24 shown in Fig. 1. The wire 23 is adequately insulated and of a length suitable to operation of the motor in places remote from the outlet 24. It should here be noted that the motor 15 can be of a type which is portable, i. e., not carried by the shank 13 but connected thereto by a conventional flexible drive shaft or cable, not shown, having its free end keyed to the drive shaft 22 in the conventional manner.

The shank 13 comprises a tubular body 25 having a suitable bearing 26 adjacent each of its ends and midway thereof, if necessary. In this manner the drive shaft 22 is rotated freely axially within the tubular body 25 during operation of the motor 15.

The drive head 12 of the tool 10 comprises a casing 30 which is substantially circular in configuration and of sufficient diameter and width to house a reduction gear unit 31, its mounting 32 and associated parts. In this connection the casing 30 includes a cup shaped portion 33 consisting of a bottom 34 and the peripheral wall 35. This peripheral wall 35 of the casing, however, is formed with one of its quadrants providing tangential sides 36 and 37 which are disposed perpendicular relative to each other as best seen in Figs. 2 and 3. The side 37 has an opening 38 formed in it to receive a threaded boss 39 of the mounting 32 for the gear unit 31. The boss 39 receives a sealing gasket g and threaded cap 40 formed on the opposite or lower end of the tubular body 25 of the shank 13 to thereby seal the opening 38 while securing the drive head to the shank.

The mounting 32 includes the boss 39 which is formed on a block 41 suitably secured to a plate 42. Also secured to the plate 42 is a bearing boss 43 in axial alignment but spaced from the boss 39. A worm drive shaft 45 is suitably journalled for rotation in ball bearings 46 and 47 within bosses 39 and 43, respectively. This shaft 45 has one of its ends 48 extending beyond the boss 39 for driving connection to the socketed lower end 49 of the drive shaft 22 within the tubular body 25.

That portion of the worm drive shaft 45 between the bearings 46 and 47 is provided with worm threading 50 which meshes with teeth 51 formed on the periphery of a worm wheel 52. The worm wheel 52 may be of conventional design but I prefer it to be of the anti-friction disc tooth type as shown and described in my copending application Serial No. 209,818 filed February 7, 1951, in the United States Patent Office. The worm wheel is secured to a spindle shaft 53 journalled axially of the circular casing 30 in the ball bearings 54 and 55. The ball bearing 54 is secured in an axial boss 56 formed on the internal wall 57 of the plate 42 and the ball bearing 55 is supported in one arm 58 of an L shaped bracket 59. The bracket 59 has its foot portion 60 secured to the internal wall 57 of plate 42 and the head 61 of its offset arm 58 is secured to the block 41 on which the boss 39 is formed. It should here be noted that the block 41, bearing boss 43 and the bracket 59, or any of them, may be formed integrally with the plate 42, the plate 42 being dimensioned to fit into the open side of the casing 30 snugly against the rim of the peripheral wall 35 thereof.

A stationary shear plate 65 is secured by diametrically opposite screws s to the external wall 66 of the plate 42 and extends beyond the periphery thereof sufficiently to overlie the rim of the cup shaped casing 30 (see Fig. 5). In this connection it will be noted that the side 67 of the quadrant formed by the tangential walls 36 and 37 of the casing is closed by an integral wall 68 so that the reduction gear unit 31 is completely enclosed within the casing 30.

The stationary plate 65 is further secured in position relative to the casing 30 by two other diametrically opposed screws s, Figs. 5, 3 and 4 having their threaded ends engaged in tapped bores on the internal wall of the bottom 34 of the cup shaped portion of the casing.

The stationary shear plate 65 has a plurality of blades 69 extending radially therefrom at circumferentially spaced intervals throughout at least a 180° arc which is substantially diametrically opposite the point of entrance of the drive shafts 22 and 45 into the drive head 12. The spindle shaft 53 extends through the open center 70 of the shear plate 65 and a rotary shear plate 71 is keyed as at 72 to the shaft 53. A retaining washer 73 is also keyed to the shaft 53 and is pressed against the stationary shear plate 65 by a nut 74 threaded onto the threaded tip 75 of the shaft 53. The rotary shear plate 71 also has a plurality of blades 76 extending radially therefrom within the same orbit as the blades 69 on the stationary shear plate 65.

As indicated by the arrows in Figs. 3 and 4 the shaft 53 turns in a particular direction to effect rotation of the rotary shear plate 71 relative to the stationary shear plate 65. In this connection it will be noted that the fore edge 77 of each stationary blade 69 is disposed radially of the shaft 53 to meet the oncoming radially disposed fore edges 78 of the movable blades 76 on the rotary shear plate 71.

The leading or fore edges 77—78 of the two sets of blades 69 and 76 are ground to a sharp ridge r adjacent their meeting surfaces 79 and 80, respectively. These surfaces 79 and 80 bear against each other and therefore are under cut or ground out as at 81 sufficiently back of their sharpened ridges r to reduce friction to a minimum. Moreover, it will be noted that the circumferential spacing of the rotary blades 76 relative to each other is substantially greater than the circumferential spacing of the stationary blades 69 so that shearing action takes place at only one pair of opposing pair of blades at a time. As a consequence of this differential in spacing the shearing load in each instance is limited to the scissor action of only one pair of blades at a time, each such scissor action occurring successively as illustrated for example in a clockwise direction from blade F to L in Fig. 3.

From the foregoing it will be apparent that the scissors action of the present invention taking place successively at a plurality of radially spaced positions around the drive head 12 the full shearing power is obtained when each set of the blades 69 and 76 close relative to each other. Moreover, since the power emanating directly from the drive shafts 19 and 22 of the source of power 11 is transmitted through the worm gearing or reduction gear unit 31, the successive single scissors action of the particular set of blades 69 and 76 closing, is further enhanced and strengthened.

During trimming of the edges of a lawn the peripheral wall 35 of the casing 30 is adapted to ride along a sidewalk or curbing while the shear blades are disposed to cut blades of grass extending toward the curbing as shown in Fig. 1.

The drive head 12 is also adapted for driving a cultivating and earth conditioning means which may be in the form of an auger 85, Fig. 7, a rotary rake or discing tool 86 or both of them combined.

The conversion of the garden tool 10 for either of the foregoing purposes entails the removal of the rotary shear plate 71 and the use of an adapter 87 shown in Figs. 6 and 7. In this connection it will be noted (Figs. 4 and 5) that the spindle shaft 53 has a bevel gear 88 keyed to it adjacent the ball bearing 54 and within the open center 70 of the stationary shear plate 65. As shown in Fig. 9 the bevel gear 88 is adapted to mesh with a similar bevel gear 89 arranged in the adapter 87 now to be explained.

The adapter 87 comprises a mounting panel 90 configurated to form a guard for the blades 69 on the stationary plate 65. In this connection the panel 90 is provided with clamping clips 91 and 92 so disposed on its inner face 93 as to engage the leading edge 77 of at least two of the stationary blades 69, preferably the first and last blades F and L as so indicated in Figs. 5 through 7.

Each clip 91 and 92 is similar in that it includes an elongated member having a tapped opening 94 adjacent one of its ends and its opposite end 95 bevel ground complementary to the angle of the leading edge 77 on the stationary blade 69. A headed screw 96 extending through the panel 90 is threadedly connected into the tapped opening 94 in the clip 91 or 92 for drawing the same toward the panel 90 so that the ground end 95 of the clip overlies the complementary leading edge 77 of the blades F and L. In this manner the panel 90 is firmly secured flatly against the stationary shear plate in the position as best seen in Fig. 9.

The outer face of plate 90 has a boss formation 98 which extends radially from an axis coincident to the axis of the drive head 12 and the spindle 53 therein to the periphery of the panel 90 in substantial parallelism with respect to the axis of the shank 13 connected to the drive head 12.

The boss formation 98 is hollowed out to provide a chamber 99 open to the inner face 90′ of the panel so as to receive the threaded tip 75 of the spindle 53. The chamber 99 is also large enough to expose the bevel gear 88 on the spindle 53 to the bevel gear 89 which is secured to an auxiliary shaft 100 journalled within the boss formation 98. In this connection the shaft 100 extends through a web 101 formed in the chamber 98 adjacent the axis of the spindle 53 so as to support the bevel gear 89 for meshing engagement with the bevel gear 88 in the drive head 12. The opposite end of the auxiliary shaft 100 extends through a bearing boss 102 at the periphery of the panel 90 so that the free end 103 of the shaft 100 is exposed.

The free end 103 of the auxiliary shaft 100 is provided with suitable keying means as for instance a square head 104 and a threaded tip 105 or the threaded tip alone. If the square head 104 is employed an auxiliary tool such as the auger 85 in Fig. 7 is provided with a mounting flange 107 having a square or keyed opening 108 adapted to fit the head 104. The flange 107 is thereupon secured to the auxiliary shaft 100 by means of a nut 109 threaded upon the threaded tip 105.

The auxiliary tool can be secured directly to the threaded tip 105 as best seen in Fig. 8, in which event the threading is such as to become tighter due to the direction of rotation of the auxiliary shaft 100 relative to the auxiliary tool. In other words the rotary rake or discing tool 86, as seen in Fig. 8, having appendages 110 engageable with obstructions (such as clods of dirt) tends to resist rotation of the tool 86 whereas the threading on the tip 105 of the shaft 100 thereby tends to become more tightly seated in the threaded bore 111 provided in the mounting flange or plate 107′ of the tool.

The tool 86 is preferably for loosening up the earth in flower beds and around shrubs and trees. If the soil becomes too caked and hardened the auger 85 is more useful preferably after the earth has been suitably dampened to render it more supple. If, as a result of using the auger 85, clods of earth are turned up they can be broken down by subsequent use of the rake or discing tool 86. In this connection it will be apparent that the auger can be connected to the discing tool 86 as is the modified form of auger 85′ shown in Fig. 8. This form of auger is shown to have a threaded shank 112 adapted to be secured to the tapped apex 113 of the tool 86 in axial alignment with the auxiliary shaft 100.

While I have specifically described what I consider to be the best mode of carrying out the principle of my invention it will be apparent that the form shown can be varied, altered and/or modified without departing from the spirit of my invention. I therefore desire to avail myself of all variations, alterations and/or modifications in construction as fairly come within the purview of the appended claims.

What I claim as new and desire to protect by Letters Patent is:

1. A lawn edge trimmer comprising a cup shaped casing including a base wall having an integral peripheral wall formed to ride on a marginal lawn element, a speed reduction unit within said casing including a driven shaft and a spindle shaft, mounting means for said speed reduction unit including a bearing boss extending through the peripheral wall of said casing, a tubular shank of a length to extend from the casing on the ground to a height of a man's hand when standing upright, said shank having sealed connection with said bearing boss, a drive shaft in said shank drivingly connected to said driven shaft, drive means on said shank in driving connection with said drive shaft, said mounting means including a plate portion forming a cover for the open side of said casing to provide a sealed enclosure for the speed reduction unit, a bearing in said plate portion for supporting said spindle shaft for rotation beyond said casing, a stationary shear plate removably secured to the cover plate and having a plurality of shear blades spaced from each other a predetermined circumferential distance and extending radially beyond the peripheral wall of said casing opposite said shank, said blades on the stationary shear plate being of substantially uniform thickness throughout their length, for insertion of one of said radially extending blades opposite said shank into the ground to guide the device during a lawn trimming operation, a rotary shear plate secured to said spindle shaft adjacent said stationary shear plate and having a plurality of radially extending shear blades co-extensive with, and cooperative with said stationary shear blades for effecting a scissor action between the two sets of shear blades at and below the surface of the earth to trim the edge of a lawn including the root growth.

2. A lawn edge trimmer comprising a sealed casing, including a curved peripheral lower portion formed to ride on a marginal lawn element, a speed reduction unit including a driven shaft and a spindle shaft journaled within said casing and in driving relation with each other, a tubular canelike shank of a length to extend from the casing on the ground to within the grasp of a man's hand when standing upright, said shank being connected to said casing, a drive shaft in said shank drivingly connected to said driven shaft, an electric drive motor on the upper portion of said shank in driving relation with the spindle shaft, a bearing in said casing for supporting said spindle shaft for rotation beyond said casing, a stationary shear plate removably secured to said casing and having a plurality of shear blades spaced from each other a predetermined circumferential distance and extending radially beyond said casing, one of said blades being disposed opposite the shank for insertion in the ground to guide the device during a lawn trimming operation, a rotary shear plate removably secured to said spindle shaft adjacent said stationary shear plate and having a plurality of radially extending shear blades co-extensive with and cooperative with said stationary shear blades for effecting a scissor action between said sets of shear blades, including the blade opposite the shank when inserted in the ground, to trim a lawn edge including the root growth.

3. A garden tool comprising a sealed casing, including a curved peripheral lower support portion, a speed reduction unit including a driven shaft and a spindle shaft journaled within said casing and in driving relation with each, other a tubular cane-like shank of a length to extend from the casing on the ground to within the grasp of a man's hand when standing upright, said shank being connected to said casing, a drive shaft in said shank drivingly connected to said driven shaft, means for connecting an electric drive motor in driving relation with the upper end of the drive shaft, a bearing in said casing for supporting said spindle shaft for rotation beyond said casing, a stationary shear blade removably secured to said casing and extending radially beyond said casing opposite the shank for insertion into the ground, a rotary shear blade removably secured to said spindle shaft adjacent said stationary shear blade to conceal and protect said bearing, said rotary shear blade having a plurality of radially extending blade elements in shearing contact with said stationary shear blade for effecting a shearing action therewith upon rotation of the rotary shear blade.

4. A garden tool comprising a sealed casing, a transversely extending spindle shaft journaled in said casing and projecting from one side thereof, a tubular cane-like shank of a length to extend from the casing on the ground to within the grasp of a man's hand when standing upright, said shank being connected to said casing, a drive shaft in said shank drivingly connected to said spindle shaft, means for mounting an electric drive motor in driving relation with the upper end of the drive shaft, a stationary shear blade removably secured to said casing and extending radially beyond said casing opposite the shank for insertion into the ground, a rotary shear blade removably secured to said spindle shaft adjacent said stationary shear blade to conceal and protect said bearing, said rotary shear blade having a plurality of radially extending blade elements in shearing contact with said stationary shear blade for effecting a shearing action therewith upon rotation of the rotary shear blade.

References Cited in the file of this patent

UNITED STATES PATENTS

| | | |
|---|---|---|
| 309,131 | Carter | Dec. 9, 1884 |
| 1,983,420 | Underwood | Dec. 4, 1934 |

FOREIGN PATENTS

| | | |
|---|---|---|
| 168,645 | Great Britain | Sept. 2, 1921 |